United States Patent
Sakuraba et al.

(10) Patent No.: US 7,703,351 B2
(45) Date of Patent: Apr. 27, 2010

(54) GAS PEDAL

(75) Inventors: Tomohiro Sakuraba, Saitama (JP); Hideto Nebuya, Saitama (JP); Takashi Sugiyama, Saitama (JP); Shigeki Nomura, Saitama (JP); Koji Terasaki, Tochigi (JP); Teruo Kato, Tochigi (JP); Toshimi Kitamura, Tochigi (JP); Tomoaki Abe, Tochigi (JP); Yoshio Abe, legal representative, Miyagi (JP)

(73) Assignees: Honda Motor Co., Ltd., Tokyo (JP); F-Tech Inc., Saitama (JP)

( * ) Notice: Subject to any disclaimer, the term of this patent is extended or adjusted under 35 U.S.C. 154(b) by 1037 days.

(21) Appl. No.: 10/509,325

(22) PCT Filed: Aug. 27, 2003

(86) PCT No.: PCT/JP03/10866

§ 371 (c)(1),
(2), (4) Date: Apr. 6, 2005

(87) PCT Pub. No.: WO2004/026610

PCT Pub. Date: Apr. 1, 2004

(65) Prior Publication Data

US 2005/0217410 A1 Oct. 6, 2005

(30) Foreign Application Priority Data

Sep. 20, 2002 (JP) .............................. 2002-274832

(51) Int. Cl.
*G05G 1/30* (2008.04)
(52) U.S. Cl. ....................................................... 74/513

(58) Field of Classification Search ................... 74/512, 74/513, 560
See application file for complete search history.

(56) References Cited

U.S. PATENT DOCUMENTS

| 2,203,933 | A | | 6/1940 | Thorp |
| 3,125,896 | A | | 3/1964 | Beisel et al. |
| 3,500,702 | A | * | 3/1970 | Waltrud et al. ................. 74/560 |
| 4,218,937 | A | * | 8/1980 | Albrecht et al. ............... 74/513 |
| 4,356,740 | A | * | 11/1982 | Kubo et al. .................... 74/560 |
| 5,063,811 | A | * | 11/1991 | Smith et al. .................... 74/513 |
| 5,319,996 | A | * | 6/1994 | Harris .......................... 74/560 |
| 5,497,677 | A | * | 3/1996 | Baumann et al. .............. 74/513 |
| 5,596,906 | A | | 1/1997 | Lin et al. |
| 5,761,967 | A | | 6/1998 | Papenhagen et al. |
| 6,318,208 | B1 | * | 11/2001 | Thongs et al. ................. 74/513 |
| 2007/0193401 | A1 | * | 8/2007 | Campbell ..................... 74/560 |

FOREIGN PATENT DOCUMENTS

| GB | 1 156 599 A | 7/1969 |
| JP | 43-2574 | 2/1943 |

(Continued)

*Primary Examiner*—Vicky A Johnson
(74) *Attorney, Agent, or Firm*—Arent Fox LLP

(57) ABSTRACT

An accelerator pedal (100) includes a stopper member (30) fixed to the floor of the driver's seat, a pad member (20) fastened to the stopper member (30) and operated by the driver's depression force, an arm (4) engaged with the pad member (20) to transmit the depression force, and a bracket (5) engaged with the arm (4) to support the arm (4), wherein the stopper member (30) is provided with a pad fitting section (17) for fastening the pad member (20), and the pad member (20) is integrally molded by a single resin material.

16 Claims, 5 Drawing Sheets

FOREIGN PATENT DOCUMENTS

| | | |
|---|---|---|
| JP | 2-32121 | 2/1990 |
| JP | 4-110623 U | 9/1992 |
| JP | 05-16449 U | 3/1993 |
| JP | 6-12160 | 2/1994 |
| JP | 6-50950 | 7/1994 |
| JP | 2001-270343 | 10/2001 |

* cited by examiner (a)

(b)

(a)

(b)

US 7,703,351 B2

GAS PEDAL

CROSS-REFERENCE TO RELATED APPLICATION

This application is a National Stage entry of International Application No. PCT/JP03/10866, filed Aug. 27, 2003, the entire specification claims and drawings of which are incorporated herewith by reference.

TECHNICAL FIELD

The present invention relates to an accelerator pedal for a vehicle, and particularly relates to an accelerator pedal, in which a pad member is integrally molded by resin and has a fit-in structure for a stopper member.

BACKGROUND ART

Conventionally, the accelerator pedal is fixed by bolts, etc. on a floor carpet that is laid entirely over the floor of the driver's seat. In the case where the floor carpet is washed, repaired or replaced with another one, it is necessary to disassemble a pad member, an arm and a bracket of the accelerator pedal, and then detach the stopper member fixed on the floor of the driver's seat.

After the floor carpet is removed and washed, repaired or replaced with another one, the stopper member is fixed on the floor by bolts, and then the pad member is fitted into the stopper member. And the arm and the bracket are engaged with the pad member, and thereafter the throttle for controlling the engine speed is readjusted.

In other words, if the accelerator pedal is once detached, the mounting position of the bracket, which supports the arm, cannot be restored, so that an adjustment of the throttle, etc. is required to control the engine speed to the original engine speed.

Further, in order to hook resinous nails provided at the pad member of the accelerator pedal through nail-catch sections of the stopper member, a fastening method, for example, employing a snap-fit structure, in which fastening is made use of the flexibility of the resin, is conventionally known. However, to perform a firm and reliable fastening made by the deflection of the resinous nails, it is necessary to further employ bolts, nuts or tapping screws.

For this reason, in such a fastening structure of resinous parts wherein the resinous nails are deflected and prevented from being pulled out, the resinous nails are made of a resin having a higher hardness instead of a soft resin ranging from resin to rubber.

For example, Japanese Laid-open Patent Application No. 2001-270343 (Pages 3-4, and FIG. 2) discloses such an accelerator pedal structure for vehicles, which includes a restricting member for restricting a relative movement between the accelerator pedal pad and the retainer in the rotation shaft direction, so as to minimize the backlash amount in the rotation shaft direction.

However, according to this conventional method, the fit-in structure where the fastening member is deflected and fitted into the corresponding fastened member upon engagement thereof prevents removal and backlash of the fastening member. The resinous nails of the fastening member are not of a deformation proof structure, for example, with respect to the deformation of the resin, therefore, it may cause a deformation and thereby causing removal of the nails regardless of whether or not the fastened member deforms.

In the case where a soft material is used for the fastening member, it may cause removal or backlash of the fastening member. To this end, a firm fastening structure for preventing the removal and backlash has been desired.

The accelerator pedal is fixed by bolts on the floor carpet that is laid entirely over the floor of the driver's seat. When the floor carpet is washed, repaired or replaced with another one, it is necessary to detach the stopper member that is fixed on the floor of the driver's seat. For this reason, in the conventional accelerator pedal, the pad member, the arm, and the bracket have to be disassembled. However, there is a drawback such that the pad member is difficult to be detached from the stopper member.

Once the arm and the bracket are disassembled, readjustment of these parts is required in order to control the engine speed to the original conditions.

The present invention is proposed to solve the above drawbacks, and the purpose of the present invention is to readily detach the pad member from the stopper member without causing removal and backlash of the pad member relative to the stopper member.

DISCLOSURE OF THE INVENTION

In order to solve the above drawbacks, an accelerator pedal according to the present invention includes: a stopper member attached to a floor of a driver's seat of a vehicle; a pad member to be fitted against the stopper member and having a pad for receiving a depression force exerted by a driver; an arm which is engaged with the pad member and transmits the depression force; and a bracket which is engaged with the arm and supports the arm; wherein the pad member is provided with a stopper fitting section by which the pad member is fitted against the stopper member, and the stopper member is provided with a pad fitting section into which the stopper fitting section is fitted, wherein a hinge section is provided for connecting the pad to the stopper fitting section, and wherein the pad member is made of resin.

According to this accelerator pedal, since the pad member is made of resin, the fastening member can be deflected and fitted due to softness of the resin material. After fastening the fastening member, it returns to the original shape, thereby preventing the removal and backlash of the fastening member.

The aforementioned accelerator pedal is characterized in that the pad, the hinge section, and the stopper fitting section are integrally molded by a single resin material.

According to this accelerator pedal, in addition to the above advantages of the accelerator pedal, since the pad member is integrally molded by a single resin material, it is possible to omit an attachment section in the pad member, thereby preventing the removal and backlash of the fastening member.

The aforementioned accelerator pedal is characterized in that the pad, the hinge section, and the stopper fitting section are made of soft polyester elastomer.

According to this accelerator pedal, in addition to the above advantages of the accelerator pedal, since the pad member is made of a soft resin, the pad member can be readily detached from the stopper member by twisting the pad member with hand. Therefore, the floor carpet can be removed with ease, resulting in a decrease of the labor involving washing, repairing or replacement of the floor carpet.

BEST MODE FOR CARRYING OUT THE INVENTION

Figure 1:
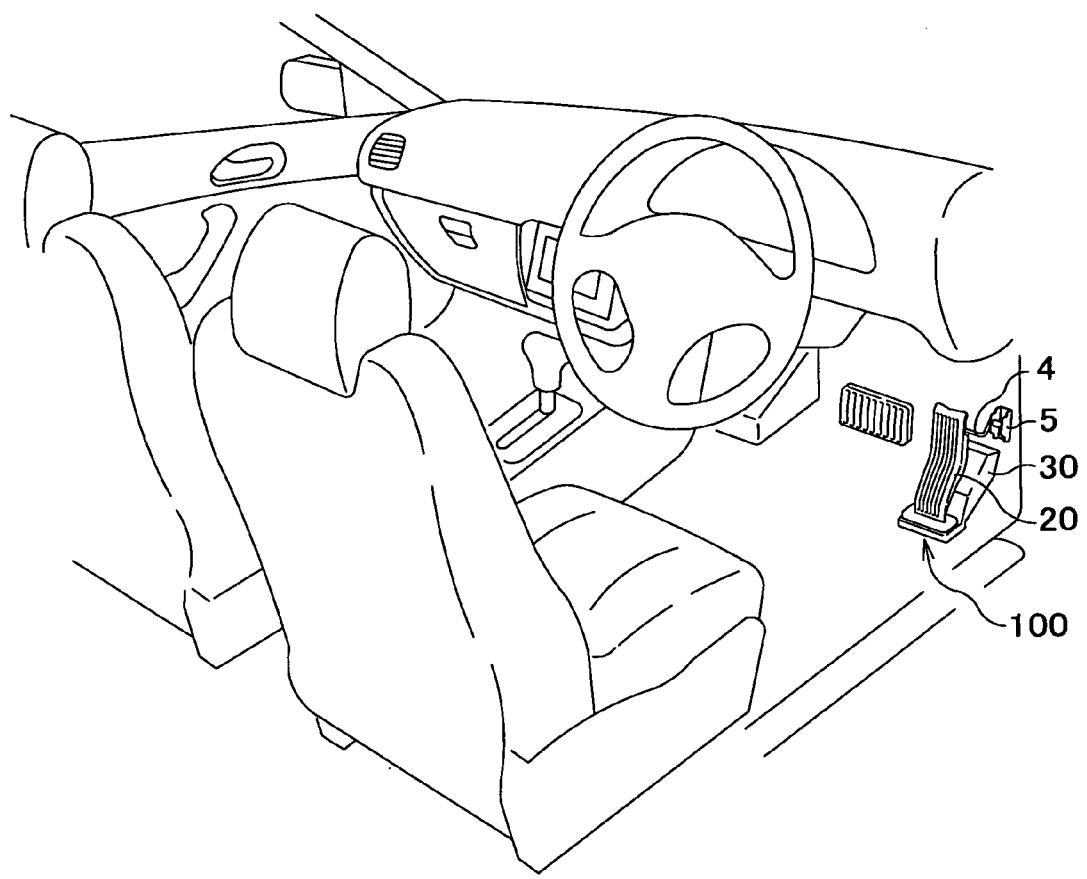
FIG. 1 is a perspective view schematically illustrating an accelerator pedal according to one embodiment of the present invention.

An accelerator pedal according to one preferred embodiment of the present invention will be described with reference to the drawings. FIG. 1 is a perspective view schematically illustrating a driver's seat where an accelerator pedal according to one embodiment of the present invention is provided at its foot. As shown in FIG. 1, the accelerator pedal 100 includes a pad member 20 to be operated by the depression force of the driver, a stopper member 30 to be mounted on a floor carpet that is laid over the floor of the vehicle, an arm 4 for transmitting the depression force exerted on the pad member 20, and a bracket 5 for supporting the arm 4. The pad member 20 and the stopper member 30 are made of a soft resin which can be readily deformed by hand. In order to provide flexibility, the pad member 20 consisting of a pad 2, a hinge section 10, and a stopper fitting section 1 is integrally molded by polyester elastomer (PE), and the stopper 30 is integrally molded by a resin which is synthesized by polypropylene (PP) and talc.

Figure 2:
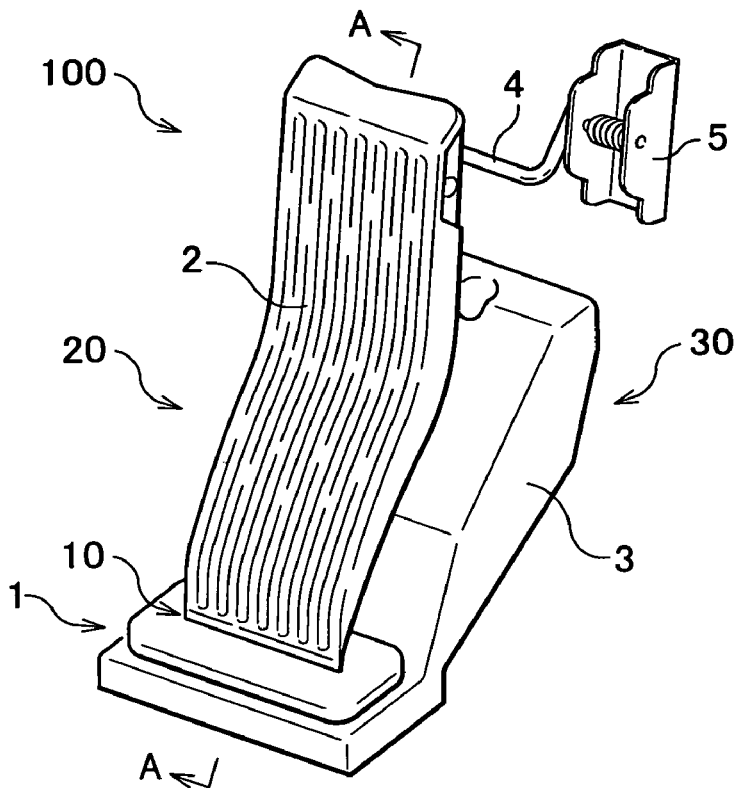
FIG. 2 is an explanatory view illustrating structure of the accelerator pedal according to one embodiment of the present invention, in which (a) is a perspective view and (b) is a longitudinal section taken along the line A-A of (a).
Figure 2:
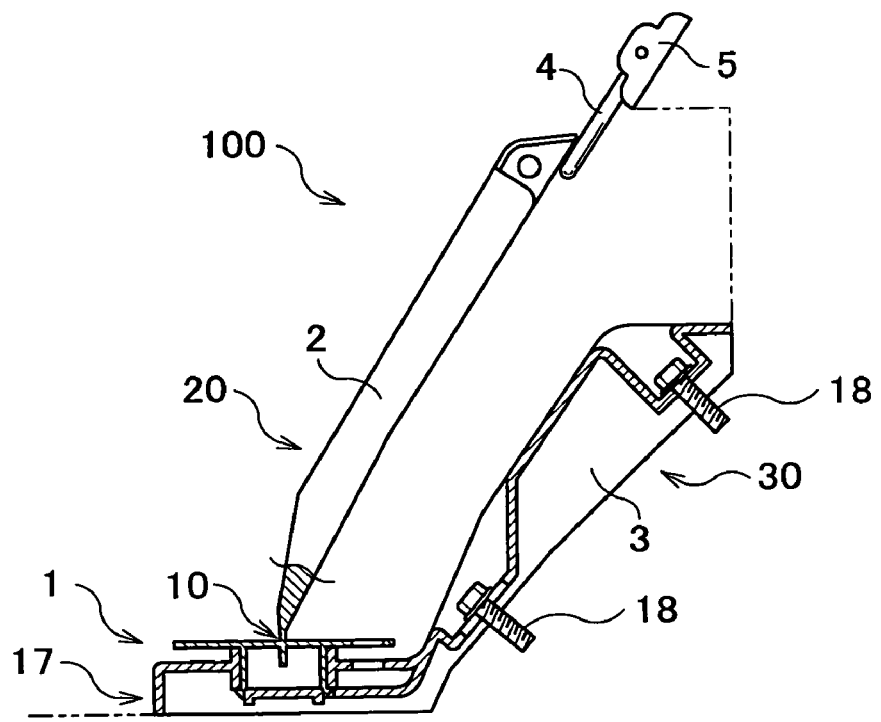

As shown in FIG. 2, the stopper member 30 is fixed to the floor surface of the vehicle over the floor carpet (not shown) by bolts 18, 18 from the interior side of the cabin. Attached to the lower end of the stopper member 30 is the lower end of the pad member 20. One end of the arm 4 is engaged with the upper end of the pad member 20, and the other end of the arm 4 is engaged with the bracket 5. The bracket 5 is engaged with the arm 4 and fixed to the vehicle body by bolts, such that the pad 2 is retained in the non-depressed position by the spring force of the spring (not shown) provided at the bracket 5. When the pad 2 is depressed by the driver's foot, the depression force is transmitted to the arm 4 and moves the throttle (not shown) connected to the arm 4, thereby controlling the rotational speed of the engine (not shown). The stopper 3 defines a lower limit for the depression of the pad 2.

Figure 3:
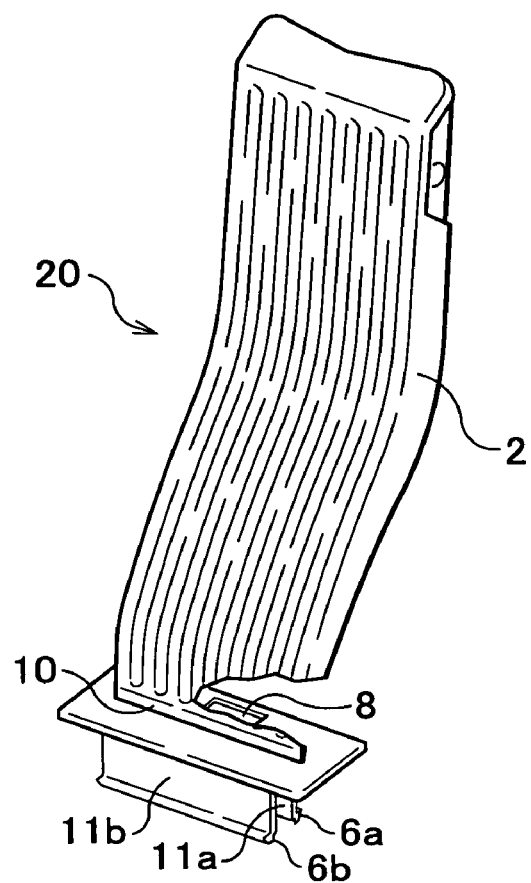
FIG. 3 is an explanatory view showing the positional relation between a pad member and a stopper member of the accelerator pedal according to one embodiment of the present invention, in which (a) is a perspective view of the pad member and (b) is a perspective view of the stopper member.
Figure 3:
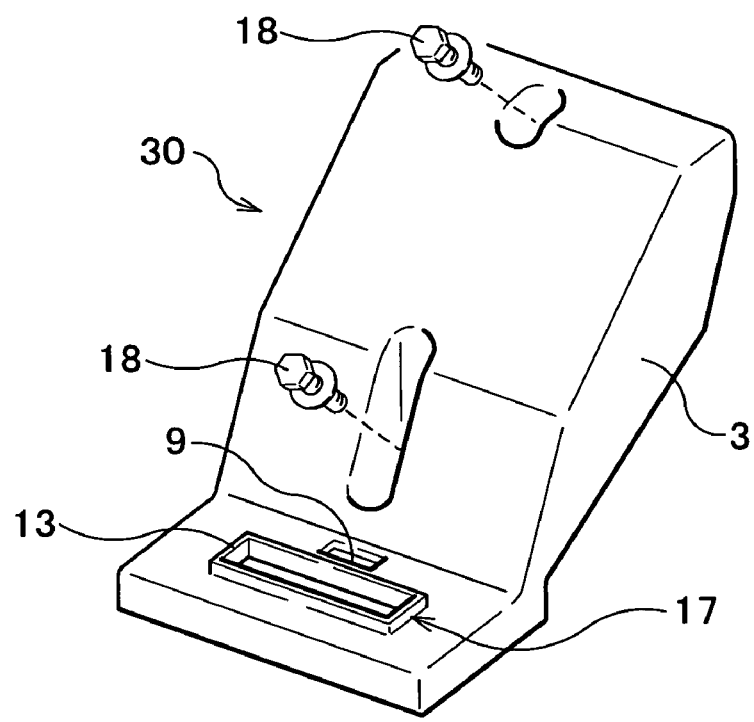

As shown in FIG. 3, nails 6a, 6b of the pad member 20 are inserted into an insertion hole 13 of the stopper 30 to fasten the pad member 20 relative to the stopper member 30. As shown in FIG. 3(a), the lower end of the pad member 20 is provided with an engagement section, and a first release hole 8 is provided in the engagement section. The first release hole 8 is used for disengaging the pad member 20 from the stopper member 30. The first release hole 8 allows, for example, a pencil-like thin rod to be inserted through for depressing a backup plate to be described later. The reference numeral 10 denotes a hinge section which joins the pad 2 and the stopper fitting section 1, and the hinge section 10 is molded integrally with the pad 2 and the stopper fitting section 1.

As shown in FIG. 3(b), the stopper member 30 is provided with the insertion hole 13 for the nails. Inserted into this insertion hole 13 are the nails 6a, 6b of the pad member 20 and supporting plates 11a, 11b for the nails, so that the fastening of the pad member 20 and the stopper member 30 can be accomplished. Further, the stopper member 30 is provided with a second release hole 9 which allows a thin rod to be inserted through for depressing the backup plate 7 to be described later.

Next, operation of the above accelerator pedal will be described.

Figure 4:
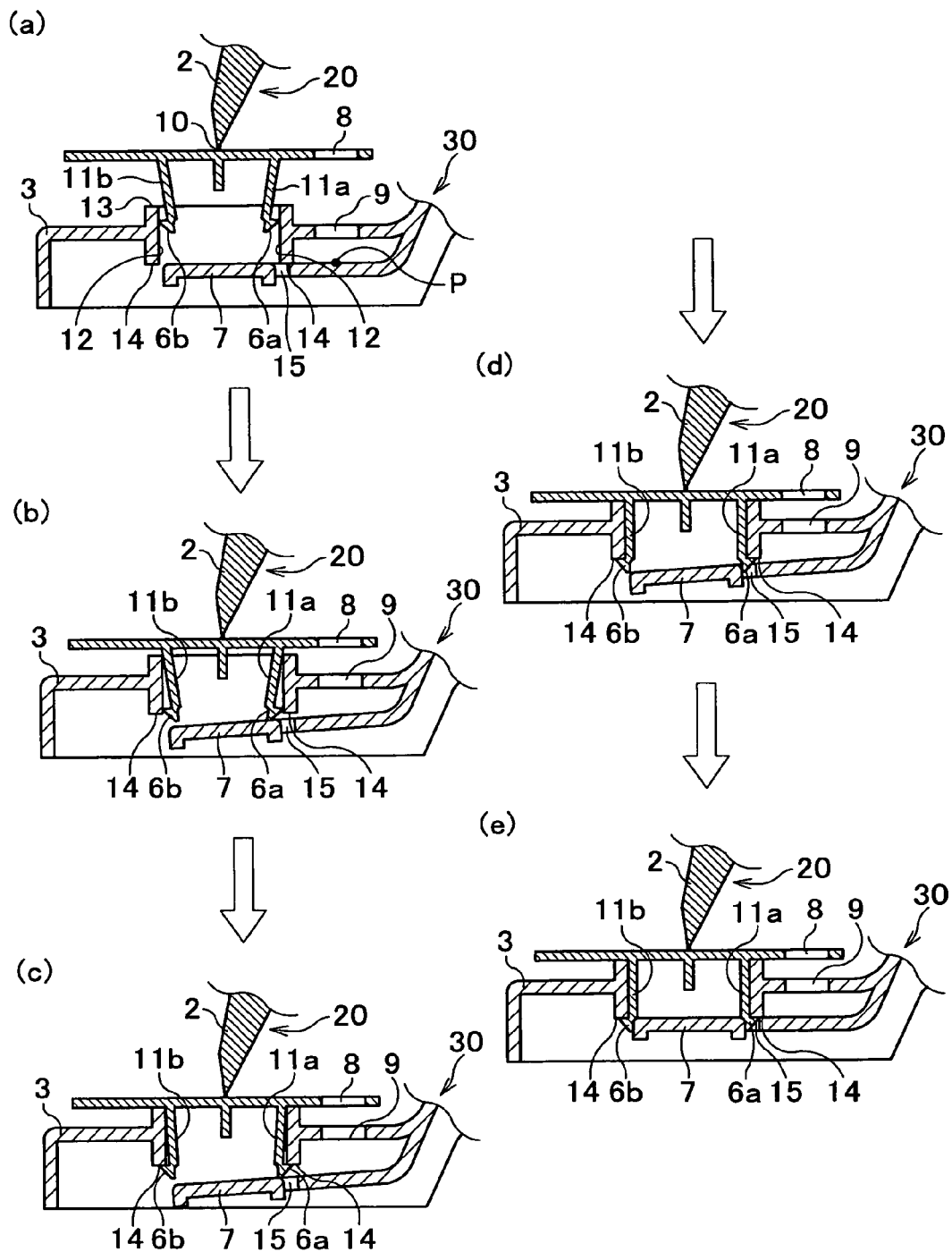
FIG. 4 shows sections of a series of operations for fastening the pad member to the stopper member of the accelerator pedal according to one embodiment of the present invention.

As shown in FIG. 4, the nails 6a, 6b and the supporting plates 11a, 11b provided at the lower end of the pad member 20 are inserted from the insertion hole 13 of the stopper member 30. FIG. 4(a) shows a state where the nails 6a, 6b at the lower end of the pad member 20, together with the supporting plates 11a, 11b, are inserted halfway through the receiving surfaces 12 for the nails of the stopper member 30. In this instance, the nails 6a, 6b are inserted together with the supporting plates 11a, 11b, while being bent inwardly. The nails 6a, 6b are facing each other in such a manner to be bent inwardly by the pressing force received from the inner surfaces of the receiving surfaces 12, 12.

FIG. 4(b) shows a state where the nails 6a, 6b and the supporting plates 11a, 11b for the nails are advanced farther into the insertion hole 13 of the stopper member 30. In this instance, one nail 6a abuts on the backup plate 7 and depresses the backup plate 7. Since the backup plate 7 is integral with the stopper member 30 and is made of a soft resin, a man can easily deform the backup plate 7.

FIG. 4(c) shows a state where the nails 6a, 6b and the supporting plates 11a, 11b for the nails are advanced farther into the insertion hole 13 of the stopper member 30. In this instance, one nail 6a abuts on the backup plate 7 and depresses the backup plate 7 farther, and the other nail 6b is hooked through the nail catch section 14. In this event, the nail 6a is not yet hooked through the nail catch section 14.

FIG. 4(d) shows a state where the nails 6a, 6b and the supporting plates 11a, 11b for the nails are advanced farther to the downward direction. In this instance, the nail 6b is hooked through the nail catch section 14, while the nail 6a enters a nail relief hole 15 provided in the backup plate 7 and is slightly hooked through the nail catch section 14.

FIG. 4(e) shows a state where the nails 6a, 6b and the supporting plates 11a, 11b for the nails are advanced farther to the downward direction. In this instance, the nails 6a, 6b are both hooked through the nail catch sections 14, 14. In this event, the backup plate 7 is released from the press-down force of the nails, and moves upward to return to the original position. By this operation, the nails 6a, 6b of the pad member 20 are both hooked through the nail catch sections 14, 14, and the backup plate 7 urges the nails 6a, 6b upward to secure the reliable engagement between the nails 6a, 6b and the nail catch sections 14, 14, thereby preventing removal and backlash of the nails 6a, 6b.

As previously described, the nails 6a, 6b are inserted through the insertion hole 13 with the supporting plates 11a, 11b for the nails bent inwardly, and return to their original position after passing through the receiving surfaces 12 for the nails, to thereby accomplish the fitting engagement between the pad member 20 and the stopper member 30. Since the nails 6a, 6b are easily deformed, the fitting operation can be readily carried out.

Further, the pad member 20 is fitted into the stopper member 30, and when the driver depresses the pad 2 of the accelerator pedal 100, the pad 2 arcuately turns upward and downward around the hinge section 10 as a fulcrum. Therefore, the arm 4 engaged with the upper end of the pad 2 is pressed and pulls the throttle (not shown) to control the rotation speed of the engine (not shown).

Figure 5:
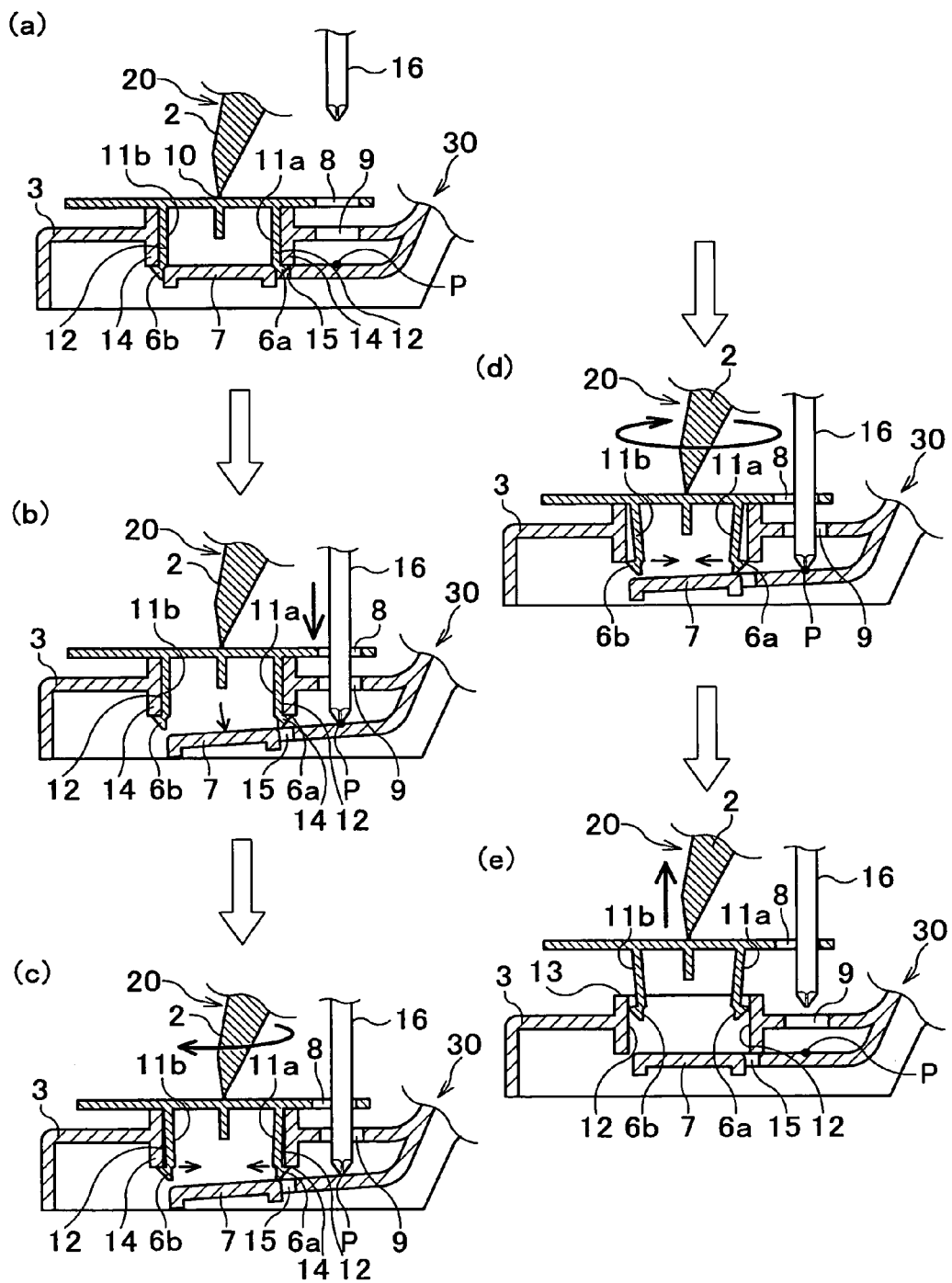
FIG. 5 shows sections of a series of operations for detaching the pad member from the stopper member of the accelerator pedal according to one embodiment of the present invention.

FIG. 5 shows sections of a series of operations for detaching the pad member 20 from the stopper member 30. FIG. 5(a) shows a state where the nails 6a, 6b and the supporting plates 11a, 11b for the nails are depressed and the nails 6a, 6b are hooked through the nail catch sections 14, 14. In this instance, the backup plate 7 positions upward. Therefore, the backup plate 7 urges the nails 6a, 6b upward so as to prevent the nails 6a, 6b from being pulled out from the nail catch sections 14, 14.

FIG. 5(b) shows a state where a thin long rod 16 such as a pencil is inserted into the first release hole 8 of the pad member 20 and the second release hole 9 of the stopper member 30 in order to detach the pad member 20 from the stopper member 30, so that the release point P of the backup plate 7 is depressed. When doing so, the nail 6a is pulled out from the nail relief hole 15. Therefore, the nails 6a, 6b are released and free from the backup plate 7.

FIG. 5(c) shows a state where one hand, for example, a right hand grips the pad 2 and turns it in the horizontal direction as shown by the arrow, while the other hand, for example, a left hand keeps on depressing the backup plate 7. In this instance, the supporting plates 11a, 11b of the pad member 20 are slightly deformed inward as shown by the arrows.

FIG. 5(d) shows a state where the pad 2 is rotated farther in the horizontal direction, so that the nails 6a, 6b are disengaged from the nail catch sections 14, 14.

FIG. 5(e) shows a state where the left hand holding the pad 2 is raised in the vertical direction, while retaining the condition illustrated in (d), so as to disengage the pad member 20 from the stopper member 30. The left hand holding the thin rod 16 such as a pencil also releases the depressing force.

As described above, since the nails 6a, 6b are made of a soft material, when the backup plate 7 is disengaged, the pad member 20 can be readily detached from the stopper member 30 by pulling out the pad 2 in the vertical direction.

Therefore, not like the conventional stopper member wherein the stopper member 30 is covered by the pad 2 and there is no space to insert the tool, it is possible to readily detach the bolts 18, 18 for fixing the stopper member 30 from the interior side of the cabin.

According to the present invention, upon removing the floor carpet that is laid on the floor of the driver's seat, it is not necessary to disassemble the arm 4 and the bracket 5. Therefore, the floor carpet can be removed without touching the throttle for controlling the engine speed, which can decrease the number of operations required.

While the present invention has been described in detail with reference to a preferred embodiment thereof, it will be apparent to one skilled in the art that the present invention is not limited to this specific embodiment and various changes or modifications may be made without departing from the scope of the claims. Although the pad member is made of polyester elastomer (PE) in the preferred embodiment, other known resin materials may be used as long as it is a resin having flexibility.

What is claimed is:

1. An accelerator pedal comprising:
   a stopper member attached to a floor of a driver's seat of the vehicle;
   a pad member having a pad for receiving a depression force exerted by a driver;
   a stopper fitting section provided on the pad member and including nails fitted into the stopper member and supporting plates connecting the pad member and the nails;
   nail catch sections provided in the stopper member and against which the nails are hooked; a hinge section provided connecting the pad member and the stopper fitting section, wherein
   the nails are hooked against the nail catch sections, and
   a backup plate is provided against which the supporting plates abut, said backup plate abutting a back side of each one of the nails and securing the engagement between the nails and the nail catch sections.

2. An accelerator pedal according to claim 1, wherein the backup plate urges the nails upward, securing the engagement between the nails and the nail catch sections.

3. An accelerator pedal according to claim 2, wherein the backup plate has a nail relief hole that receives one of the nails when the nails are hooked against the nail catch sections.

4. An accelerator pedal according to claim 3, wherein a first release hole is provided in the stopper fitting section and a second release hole is provided in the stopper member around the nail catch section in alignment with the first release hole.

5. An accelerator pedal according to claim 4, wherein the pad member, the hinge section, the stopper fitting section are integrally molded in a resin material.

6. An accelerator pedal according to claim 3, wherein the pad member, the hinge section, the stopper fitting section are integrally molded in a resin material.

7. An accelerator pedal according to claim 2, wherein a first release hole is provided in the stopper fitting section and a second release hole is provided in the stopper member around the nail catch section in alignment with the first release hole.

8. An accelerator pedal according to claim 7, wherein the pad member, the hinge section, the stopper fitting section are integrally molded in a resin material.

9. An accelerator pedal according to claim 2, wherein the pad member, the hinge section, the stopper fitting section are integrally molded in a resin material.

10. An accelerator pedal according to claim 1, wherein the backup plate has a nail relief hole that receives one of the nails when the nails are hooked against the nail catch sections.

11. An accelerator pedal according to claim 10, wherein a first release hole is provided in the stopper fitting section and a second release hole is provided in the stopper member around the nail catch section in alignment with the first release hole.

12. An accelerator pedal according to claim 11, wherein the pad member, the hinge section, the stopper fitting section are integrally molded in a resin material.

13. An accelerator pedal according to claim 10, wherein the pad member, the hinge section, the stopper fitting section are integrally molded in a resin material.

14. An accelerator pedal according to claim 1, wherein a first release hole is provided in the stopper fitting section and a second release hole is provided in the stopper member around the nail catch section in alignment with the first release hole.

15. An accelerator pedal according to claim 14, wherein the member, the hinge section, the stopper fitting section are integrally molded in a resin material.

16. An accelerator pedal according to claim 1, wherein the pad member, the hinge section, the stopper fitting section are integrally molded in a resin material.

* * * * *